(12) United States Patent
Höfner

(10) Patent No.: US 8,047,574 B2
(45) Date of Patent: Nov. 1, 2011

(54) PASSENGER AUTOMOBILE

(75) Inventor: Johannes Benedikt Höfner, Stuttgart (DE)

(73) Assignee: Daimler AG, Stuttgart (DE)

( * ) Notice: Subject to any disclaimer, the term of this patent is extended or adjusted under 35 U.S.C. 154(b) by 42 days.

(21) Appl. No.: 12/460,547

(22) Filed: May 28, 2009

(65) Prior Publication Data

US 2009/0322068 A1   Dec. 31, 2009

Related U.S. Application Data

(63) Continuation-in-part of application No. PCT/EP2007/009434, filed on Oct. 31, 2007.

(30) Foreign Application Priority Data

Nov. 29, 2006   (DE) .................. 10 2006 056 222

(51) Int. Cl.
*B60P 3/22* (2006.01)

(52) U.S. Cl. ....................................... 280/834; 280/830
(58) Field of Classification Search .................. 280/830, 280/834
See application file for complete search history.

(56) References Cited

U.S. PATENT DOCUMENTS

| | | | | |
|---|---|---|---|---|
| 4,457,525 A * | 7/1984 | Tanaka et al. | ................. | 280/834 |
| 4,550,923 A | 11/1985 | Ogawa et al. | | |
| 5,370,418 A | 12/1994 | Pugh | | |
| 6,827,371 B2 * | 12/2004 | Greil | .............. | 280/834 |
| 6,830,114 B2 * | 12/2004 | Hammonds | ................... | 180/6.2 |
| 7,232,156 B2 * | 6/2007 | Rife et al. | ...................... | 280/834 |
| 2004/0173391 A1 * | 9/2004 | Amori et al. | ................. | 180/65.1 |
| 2005/0046170 A1 * | 3/2005 | Uhara et al. | ................... | 280/834 |
| 2005/0161934 A1 * | 7/2005 | Rife et al. | ....................... | 280/831 |
| 2005/0224265 A1 | 10/2005 | Mizuno | | |
| 2009/0133948 A1 * | 5/2009 | Ijaz et al. | .................... | 180/69.4 |

FOREIGN PATENT DOCUMENTS

| | | |
|---|---|---|
| DE | 101 63 029 | 9/2002 |
| DE | 102 97 132 | 7/2004 |
| DE | 102005003669 | 8/2005 |
| EP | 0 067 651 | 12/1982 |
| JP | 2002 370550 | 12/2002 |
| JP | 2004026117 | 1/2004 |
| JP | 2005212513 | 8/2005 |
| JP | 2005212729 | 8/2005 |
| WO | WO2006/029415 | 3/2006 |
| WO | WO2006/057765 | 6/2006 |

* cited by examiner

*Primary Examiner* — Paul N Dickson
*Assistant Examiner* — Tashiana Adams
(74) *Attorney, Agent, or Firm* — Klaus J. Bach

(57) ABSTRACT

In a passenger automobile having a pressure tank which extends along the longitudinal vehicle axis, the tank comprises between its front and rear ends at least one conical section.

6 Claims, 5 Drawing Sheets

PASSENGER AUTOMOBILE

This is a Continuous-In-Part Application of International patent application PCT/EP2007/009434 filed Oct. 31, 2007 and claiming the priority of German patent application 10 2006 056 222.4 filed Nov. 29, 2006.

BACKGROUND OF THE INVENTION

The invention relates to a passenger automobile with a pressure tank having an axis extending along the longitudinal vehicle axis.

So as to be able to carry a larger amount of gaseous fuel in vehicles, and in order to increase the operating range of the vehicles, it is known to use so-called pressure tanks for storing gaseous fuels. These pressure tanks are constructed so that they can contain an amount of fuel as large as possible, especially hydrogen, at pressures of up to 700 bar. The known pressure tanks have a cylindrical cross section for accommodating these pressures.

DE 101 63 029 A1 discloses a fuel cell vehicle with a cylindrical high pressure hydrogen tank, where the tank is arranged in a transverse manner in the upper section of the rear end of the motor vehicle.

JP 2002370550 A1 also shows a vehicle where several identical high pressure hydrogen tanks are arranged transversely near the rear vehicle axle. These high pressure hydrogen tanks also have a cylindrical cross section.

JP 2005212729 A1 discloses an arrangement of two or more cylindrical high pressure hydrogen tanks arranged transversely near the rear axle. One tank has a smaller diameter than the other for better utilization of the available installation space.

From DE 10 2005 003 669 A1, JP 2005212513 A1 and US 2005/0224265 A1 arrangements of the cylindrical high pressure hydrogen tanks in the transverse vehicle direction and also in the longitudinal vehicle direction are known. JP 2005212513 A1 suggests hereby to arrange the cylindrical tank in the center tunnel.

In the specifications WO 2006/029415 A2, JP 2004026117 A1 and DE 102 97 132 T5, it is suggested to arrange several cylindrical high pressure hydrogen tanks along the longitudinal vehicle axis. So as to use the available installation space as well as possible, the cylindrical tanks are either arranged in the vehicle center or at the side of the vehicle. Also, the diameters of the cylindrical tanks may be different.

It is the object of the present invention to provide a passenger automobile with a pressure tank, in which a large amount of fuel can be carried with relatively small requirement for otherwise usable space.

SUMMARY OF THE INVENTION

In a passenger automobile having a pressure tank which extends along the longitudinal vehicle axis, the tank comprises between its front and rear ends at least one conical section.

The arrangement provides for a greater freedom for the design and arrangement of the pressure tank by means of the conical part. An available installation space with a variable cross section can hereby advantageously be used as well as possible, without requiring one or several further cylindrical pressure tanks with a corresponding diameter. By means of the conical form and also the hemispherical form of the pressure tank, it is possible to design the tank for accommodating high pressures, and thus store a larger amount of fuel on board of the passenger automobile.

In an advantageous vehicle concept, the pressure tank is arranged so as to extend centrally in the longitudinal vehicle direction, especially within a center tunnel and/or between two vehicle seats.

In a particularly advantageous vehicle concept, the pressure tank has a linearly decreasing radius between its end sections.

In a further especially advantageous vehicle concept, the pressure tank has a first part with a continually decreasing radius between its end parts, a second part with a constant radius, and optionally a third part with a constant radius.

The pressure tank is preferably designed as a high pressure hydrogen tank in a passenger automobile with a fuel cell or an internal combustion engine operated by hydrogen.

The invention and particular advantages thereof will become more readily apparent from the following description thereof on the basis of the accompanying drawings. Two embodiments of the invention are shown in the drawing. The description and the claims contain numerous characteristics in combinations.

DESCRIPTION OF PARTICULAR EMBODIMENTS

Figure 1:
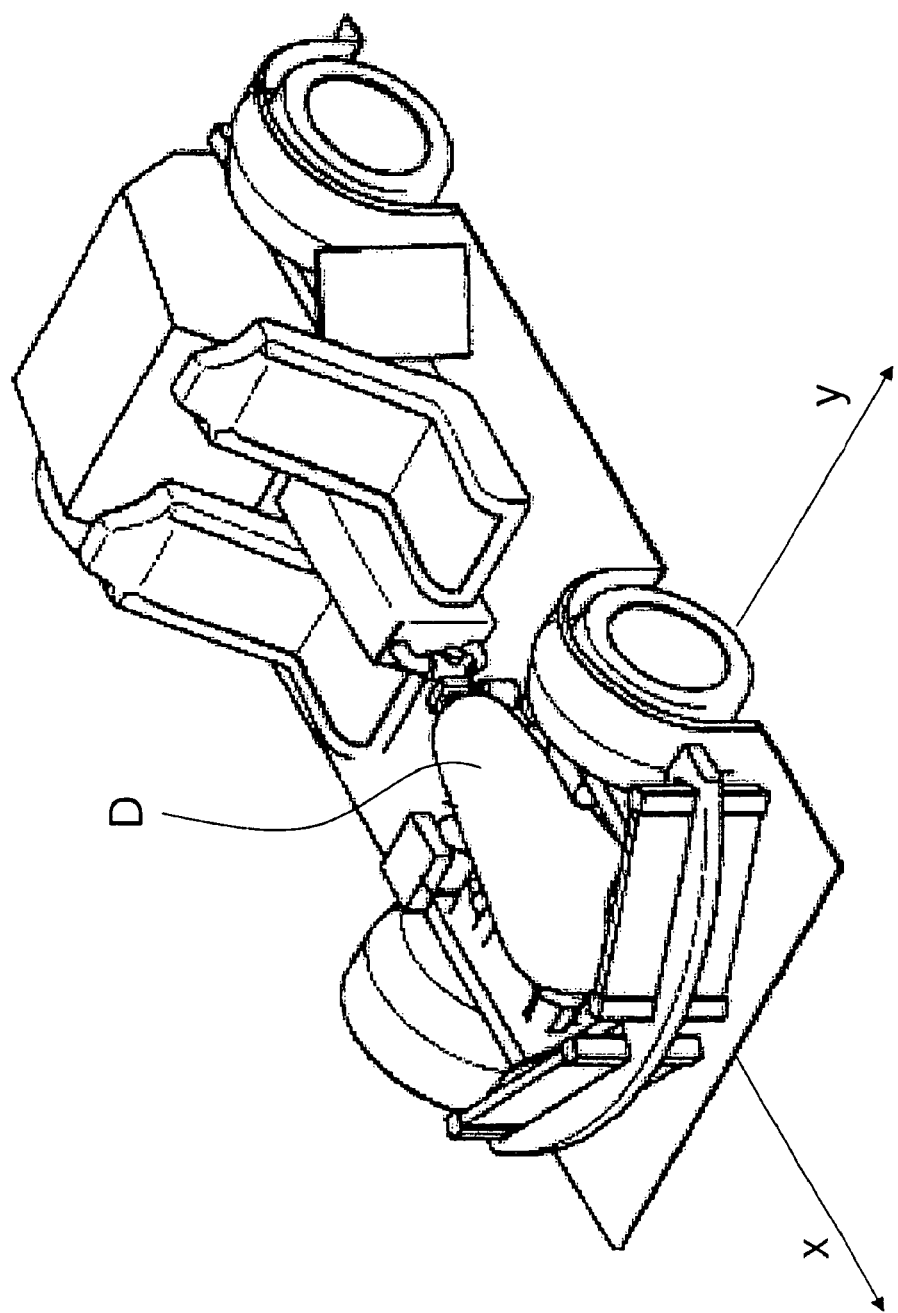
FIG. 1 shows a first embodiment of a passenger automobile according to the invention, wherein the pressure tank has a linearly decreasing diameter between its ends.

FIG. 1 shows a passenger automobile with a pressure tank D, which is arranged along the longitudinal vehicle axis x over the front axle of the passenger automobile. The pressure tank D is arranged centrally with regard to the transverse vehicle direction y along the longitudinal center axis of the vehicle.

Figure 2:
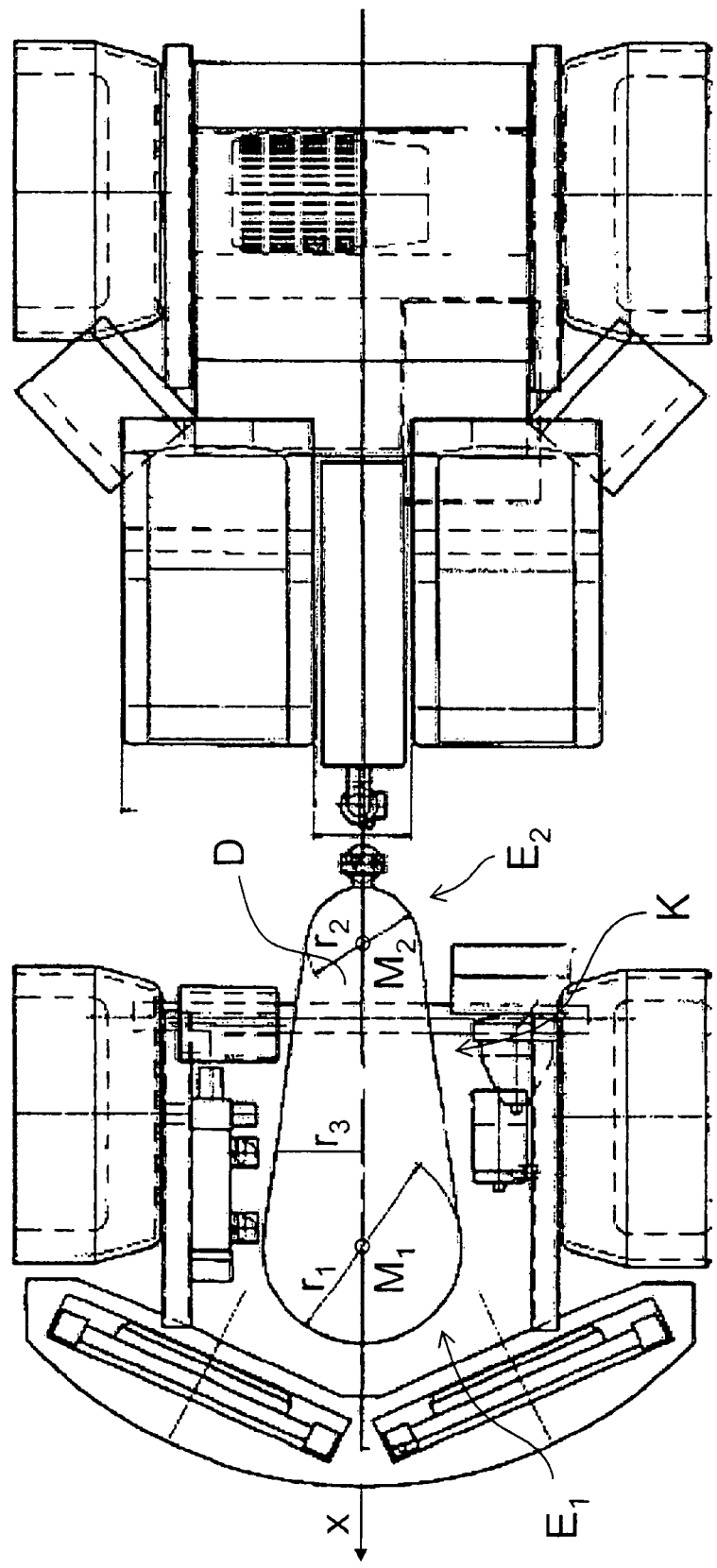
FIG. 2 shows the embodiment according to FIG. 1 in a top view.

As can be seen especially in FIG. 2, the pressure tank D has a first end part $E_1$, a second end part $E_2$, and a conical part K with linearly decreasing radius $r_3$ therebetween. The end parts $E_1$ and $E_2$ are semi-spherical with radii $r_1$ and $r_2$ and the centers $M_1$ and $M_2$.

Conical or linearly decreasing in the sense of the invention here also includes deviations caused by the manufacture, which lead to a concave or convex form. This is especially valid for the transitions from the end parts $E_1$ and $E_2$ to the conical part K.

With the design of the conical part K of the pressure tank D, and thus the progression of the radius $r_3$ of the conical part K, the stability of the pressure tank D with regard to the desired pressures has to be considered.

Figure 3:
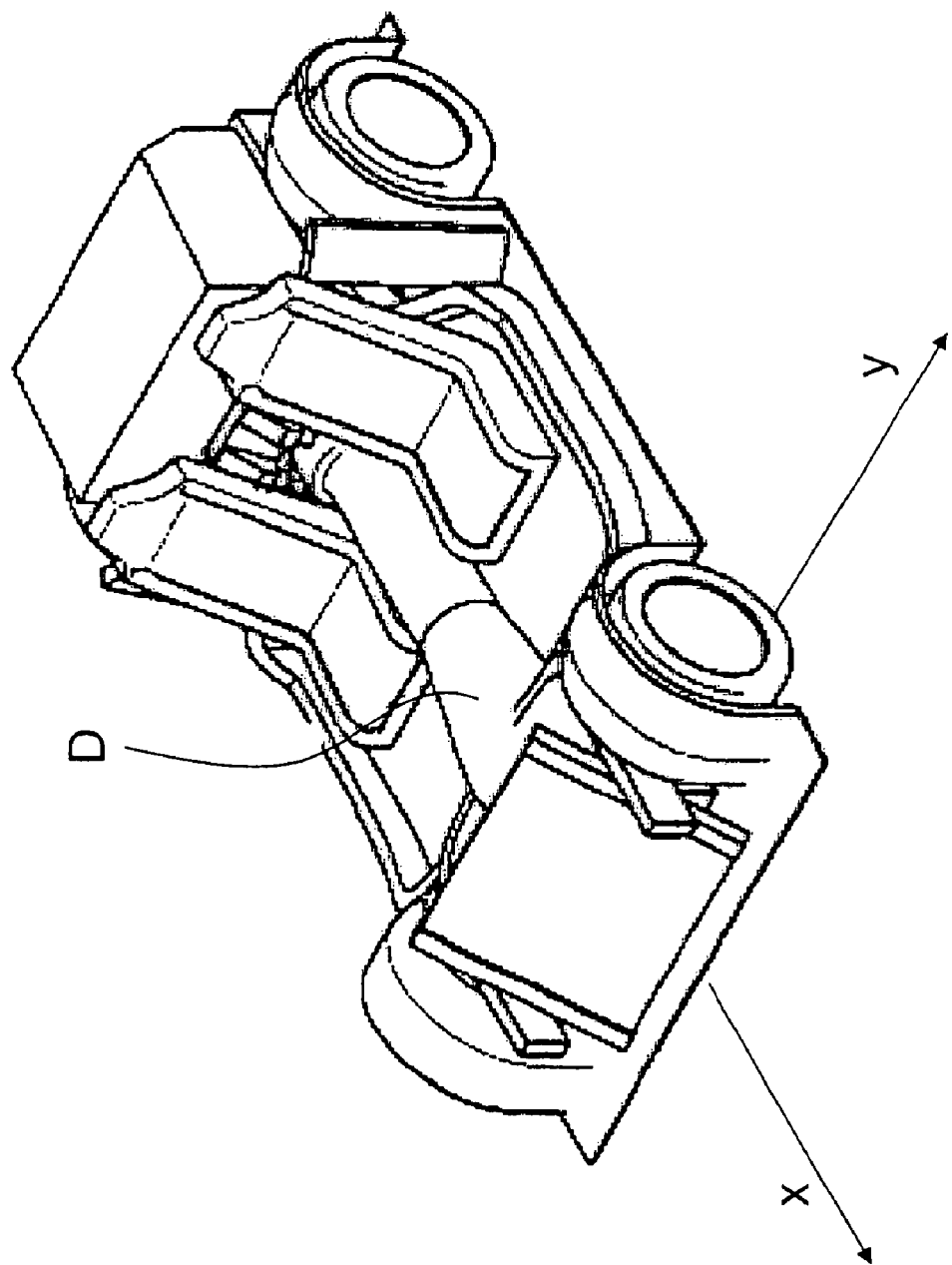
FIG. 3 shows a second embodiment of a passenger automobile according to the invention, wherein the pressure tank has a section with a linearly decreasing diameter between its ends, and two sections with different constant radii.

In FIG. 3, a passenger automobile with a pressure tank D is shown, wherein the pressure tank is arranged along the longitudinal vehicle axis x and extends almost from the front axis to the rear axis. In a transverse vehicle direction y, the pressure tank D is arranged centrally between two vehicle seats.

Figure 4:
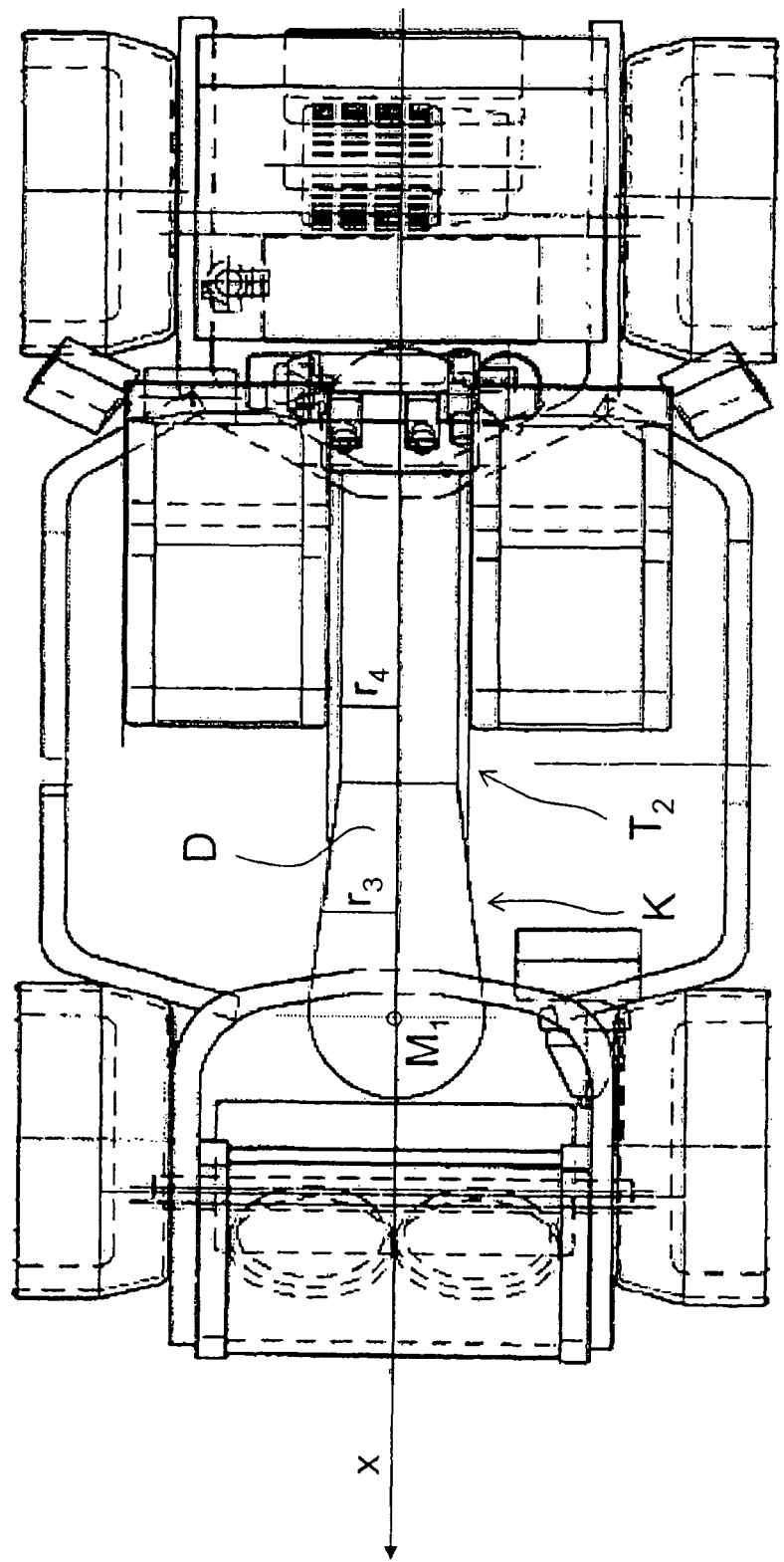
FIG. 4 shows the embodiment according to FIG. 3 in a top view.
Figure 5:
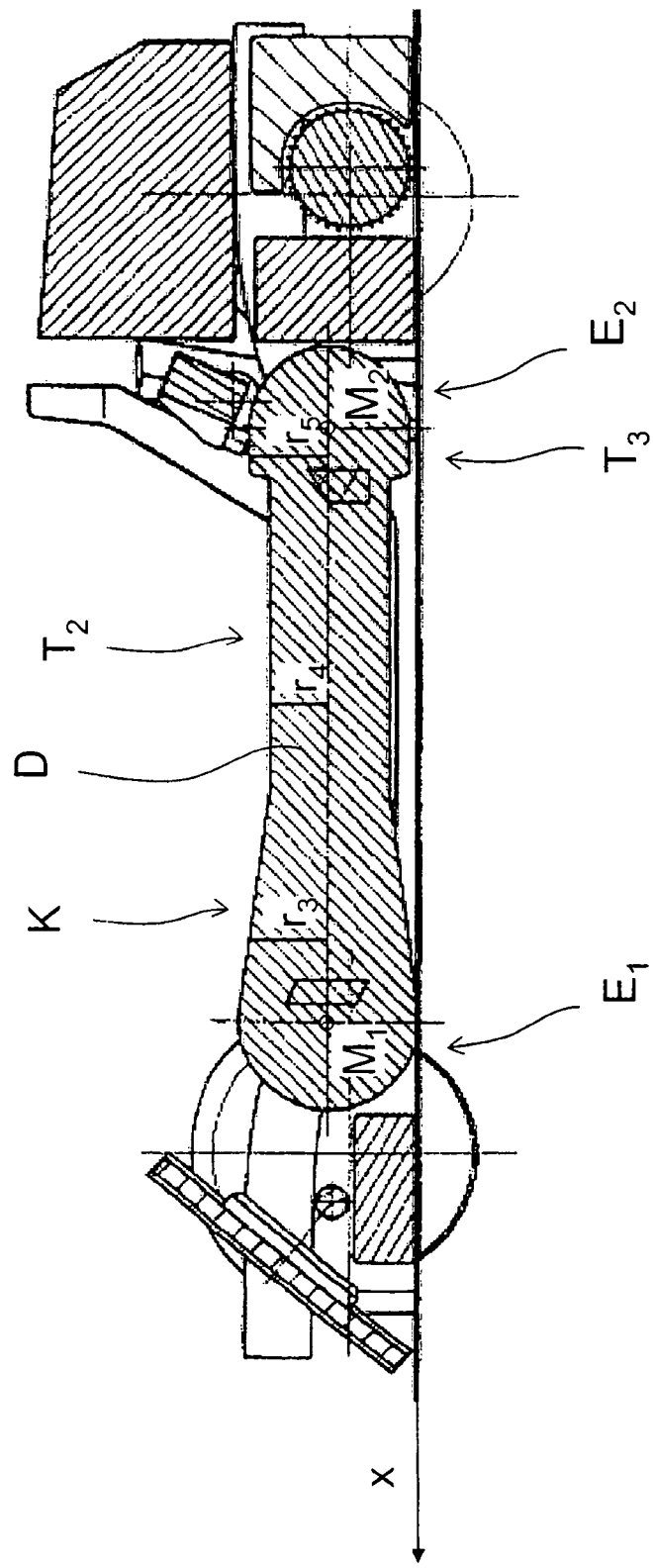
FIG. 5 shows the embodiment according to FIG. 3 in a side view.

As can be seen particularly from FIGS. 4 and 5, the pressure tank D according to the embodiment shown in FIG. 3 also has two hemispherical end parts $E_1$ and $E_2$ with centers $M_1$ and $M_2$. Starting from the end part $E_1$, a first conical part K with linearly decreasing radius $r_3$ is provided followed by a second part $T_2$ with a constant radius $r_4$, and a third part $T_3$ with a constant radius $r_5$, wherein the radius $r_5$ of the third part $T_3$ is larger than the radius $r_4$ of the second part $T_2$. The concluding hemispherical end part $T_2$ has a smaller radius than the end part $E_1$.

Due to the available installation space, the parts K, $T_2$ and $T_3$ can also be arranged in a different sequence, or further parts can be added. The end part $E_2$ can also have a larger radius than the end part $E_1$.

A drive train may extend within a center tunnel in passenger automobiles with a front engine and rear drive, or also rear engine and front drive. If a passenger automobile, for example with a fuel cell and electric motors at the driven axis or the driven wheels, does not have a drive train in the center tunnel, the pressure tank D can advantageously be arranged within the center tunnel, for example as a high pressure hydrogen tank. Changes at the body are thus kept low for the pressure tank D, and the pressure tank D is additionally protected in case of an accident.

What is claimed is:

1. A passenger automobile with a pressure tank (D) arranged along the longitudinal vehicle axis (x), wherein the pressure tank (D) comprises at least one conical part (K), with a linearly decreasing radius ($r_3$) and end parts ($E_1$, $E_2$) between which the conical part (K) is disposed.

2. A passenger automobile according to claim 1, wherein the end parts ($E_1$, $E_2$) of the pressure tank (D) are in the form of hemispheres.

3. A passenger automobile according to claim 1, wherein the pressure tank (D) extends along the longitudinal axis of the vehicle and centrally in the transverse vehicle direction (y).

4. A passenger automobile according to claim 3, wherein the pressure tank (D) is arranged between vehicle seats.

5. Passenger automobile according to claim 3, wherein the pressure tank (D) is arranged within a center tunnel.

6. Passenger automobile according to claim 1, wherein the pressure tank (D) is a hydrogen tank.

\* \* \* \* \*